United States Patent
Etherington et al.

(10) Patent No.: US 6,615,979 B2
(45) Date of Patent: Sep. 9, 2003

(54) CONVEYOR BELT AND METHOD OF ASSEMBLY

(75) Inventors: Michael Etherington, Winchester, VA (US); Joy B. Henderson, Winchester, VA (US)

(73) Assignee: Ashworth Bros., Inc., Winchester, VA (US)

( * ) Notice: Subject to any disclaimer, the term of this patent is extended or adjusted under 35 U.S.C. 154(b) by 0 days.

(21) Appl. No.: 09/922,202

(22) Filed: Aug. 6, 2001

(65) Prior Publication Data

US 2003/0024794 A1 Feb. 6, 2003

(51) Int. Cl.⁷ .............................................. B65G 17/06
(52) U.S. Cl. ........................ 198/851; 198/852; 198/853
(58) Field of Search ................................ 198/851, 852, 198/853

(56) References Cited

U.S. PATENT DOCUMENTS

| | | |
|---|---|---|
| 3,333,678 A | 8/1967 | Rodman |
| 3,416,645 A | 12/1968 | Jones |
| 3,799,328 A | 3/1974 | Harvey |
| 4,006,817 A | 2/1977 | Paul |
| 4,222,483 A | 9/1980 | Wootton et al. |
| 4,469,221 A | 9/1984 | Albert |
| 4,582,193 A | 4/1986 | Larsson |
| 4,858,753 A | 8/1989 | Hodlewsky |
| 5,031,757 A | 7/1991 | Draebel et al. |
| 5,070,999 A | 12/1991 | Layne et al. |
| 5,372,248 A | 12/1994 | Horton |
| 5,598,916 A | 2/1997 | Horton et al. |
| 5,775,480 A | 7/1998 | Lapeyre et al. |
| 5,782,340 A | 7/1998 | Dolan |
| 6,029,802 A | 2/2000 | Musiari et al. |
| 6,036,001 A | 3/2000 | Stebnicki et al. |
| 6,129,202 A | 10/2000 | Layne et al. |

FOREIGN PATENT DOCUMENTS

EP    0 521 506 A2    1/1993

*Primary Examiner*—Douglas Hess
(74) *Attorney, Agent, or Firm*—Nixon Peabody LLP; Tim L. Brackett, Jr.; Daniel S. Song

(57) ABSTRACT

A method for assembling a conveyor belt and a conveyor belt is provided, the conveyor belt including a plurality of elongated rods, a plurality of slide-in overlay elements, and a plurality of retaining overlay elements having a vertical opening to allow vertical insertion of the retaining overlay element on to an elongated rod. In one embodiment, the vertical opening includes a retainer such as a clip that resists removal of the retaining overlay element from the elongated rod. In another embodiment, the slide-in overlay element includes a lock mechanism which locks the retaining overlay element with the slide-in overlay element to resist removal of the retaining overlay element. The lock mechanism preferably includes a lock protrusion on the slide-in overlay element, and an interlock protrusion provided on the retaining overlay element offset relative to one another to allow interlocking of the lock protrusion with the interlock protrusion.

32 Claims, 6 Drawing Sheets

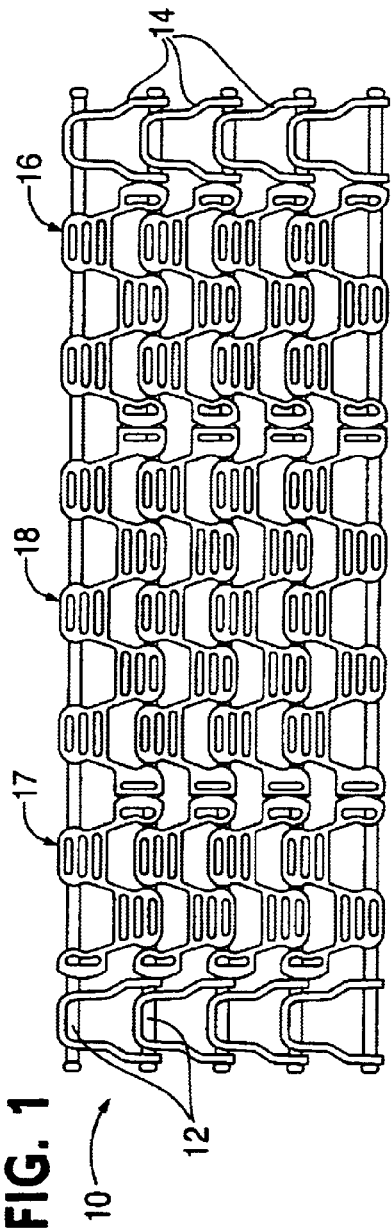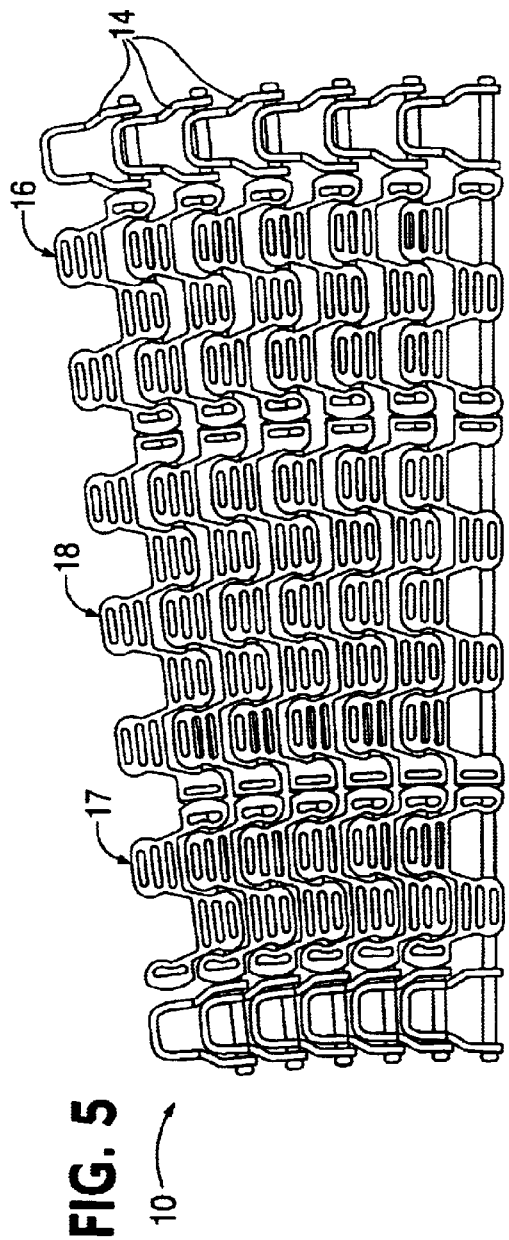

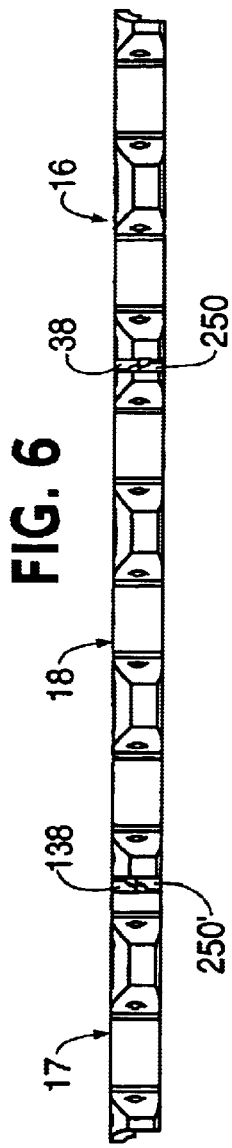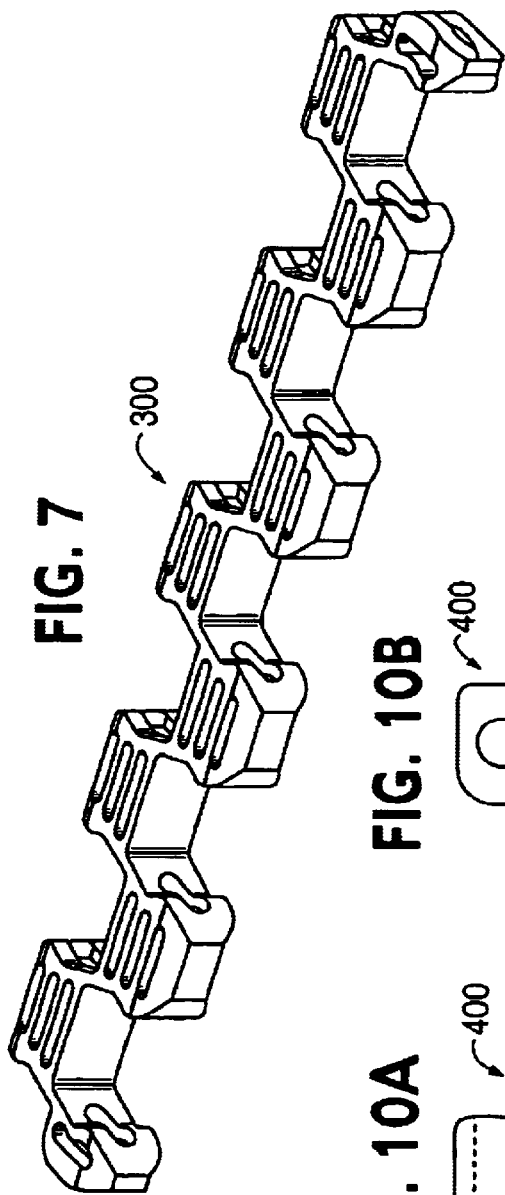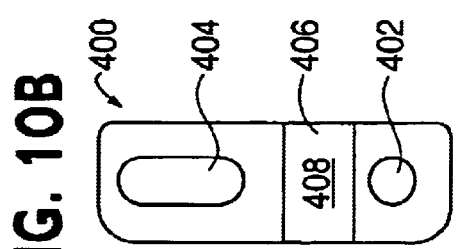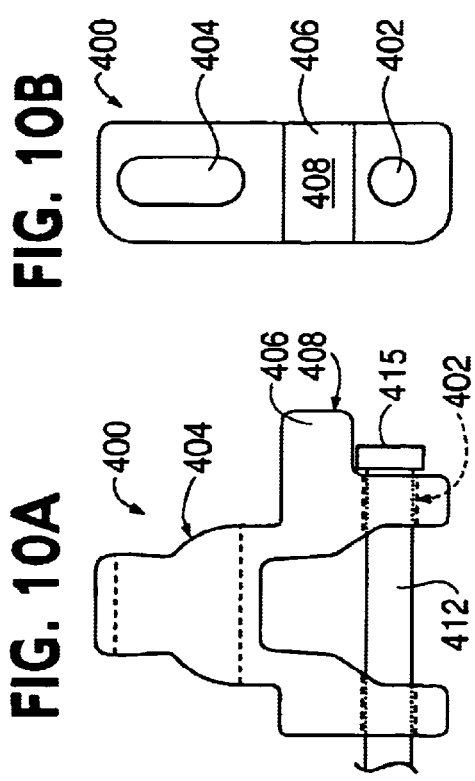

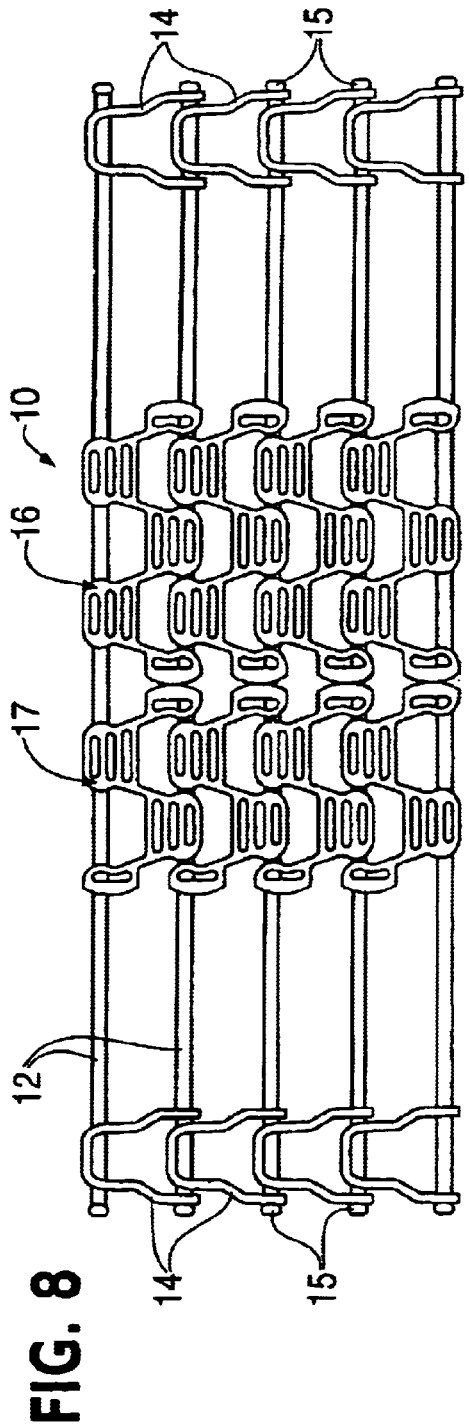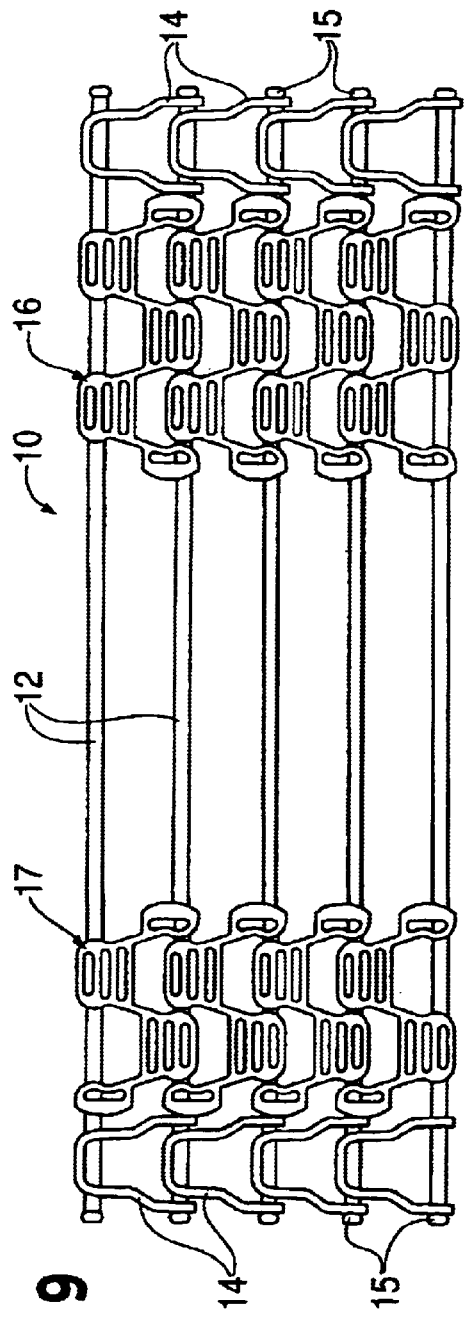

CONVEYOR BELT AND METHOD OF ASSEMBLY

BACKGROUND OF THE INVENTION

1. Field of the Invention

The present invention is directed to conveyor belts and methods for assembling conveyor belts.

2. Description of Related Art

Conveyor systems are commonly used in various industrial fields for material handling and processing purposes. For instance, conveyor systems are used in food processing systems in which food items are placed on the support surface of a conveyor belt and are processed while being conveyed from one location to another. For instance, the food items may be cooked, baked, frozen, washed, or subject to other processing steps while being conveyed on the conveyor belt. Various different types of conveyor belts have been used in such applications such as wire mesh conveyor belts but various hybrid belts have become especially popular in such food processing systems and other applications where a flat support surface is desirable to provide greater support for the objects being conveyed. Moreover, such conveyor systems are used in a helical accumulator such as that disclosed in U.S. Pat. No. 5,070,999 to Layne et al. which allows storage of large number of items in the conveyor system.

In such hybrid conveyor belts, a plurality of elongated rods are interconnected with one another via plurality of links such as drive links that may be mounted to the end of the elongated rods. The elongated rods and the drive links are typically made of metal to ensure sufficiently strong interconnection between the elongated rods. Moreover, the drive links are typically welded to the ends of the elongated rods to maintain the positioning of the elongated rods as the conveyor belt is driven through the conveyor system.

The hybrid conveyor belts also include a plurality of overlay elements which are mounted to the elongated rods of the conveyor belt, the plurality of overlay elements providing the conveying surface. The overlay elements are generally made of a non-metallic material such as plastic, nylon, or other composite materials. The use of such overlay elements has become popular especially in food processing applications because the conveyance surfaces provided by such overlay elements are easy to clean and can be treated to resist growth of pathogens such as germs, fungus, viruses and bacteria. In such a manner, hybrid conveyor belts can aid in the reduction of food borne ailments by improving sanitation.

The overlay elements of a hybrid conveyor belt are typically mounted to the elongated rods in various ways. One common method is by providing the overlay elements with a clip feature which directly clip on to the elongated rods thereby securing the overlay elements thereon. For instance, U.S. Pat. Nos. 3,416,645 to Jones, No. 3,799,328 to Harvey, and No. 4,582,193 to Larsson disclose various hybrid conveyor belts with overlay elements having a clip with vertical openings that allow vertical insertion of the overlay elements on to the elongated rods. However, the present inventors have found limitations in such prior art hybrid conveyor belts as discussed in further detail below that limits the applications in which such conveyor belts can be used.

In other hybrid conveyor belt configurations, the overlay elements are not provided with any vertical openings, but instead are merely provided with transverse openings that slidably receive an elongated rod. In such hybrid conveyor belts, the drive links must be properly mounted to the ends of the elongated rods to ensure that the overlay element does not slide off the elongated rods. However, because the overlay elements are made of plastic or other composite materials and melt when exposed to very high temperatures, metal drive links cannot be readily used since they cannot be welded, or otherwise mounted to the elongated rods. Consequently, drive links made of plastic or other composite material must also be used.

In this regard, U.S. Pat. No. 5,031,757 to Draebel et al. discloses this type of hybrid conveyor belt in which the overlay elements are slid on to the elongated rods. To mount the drive links to the end of the elongated rods, Draebel et al. discloses that the drive links includes an opening for receiving a locking tab that engages a notch provided on the ends of the elongated rod when the locking tab is inserted into the opening of the drive link. In this manner, the overlay elements are prevented from sliding off the elongated rods and the drive links are mounted to the ends of the elongated rods. However, the present inventors have found that there are disadvantages to such prior art hybrid conveyor belts as described hereinbelow.

SUMMARY OF THE INVENTION

More specifically, with respect to the hybrid conveyor belts where the overlay elements are clipped to the elongated rods, the present inventors found that these overlay elements often become detached from the elongated rods. For instance, when such overlay elements are used to convey food items which are sticky and adhere to the conveying surface of the overlay elements, the overlay elements tended to detach from the elongated rods together with the food item when the food item is removed from the conveyor belt. In other applications such as when food items are frozen on the conveyor belt, the food items also tended to adhere to the surface of the conveying surface of the overlay element so that upon its removal, the overlay element also became detached from the elongated rod. Therefore, such hybrid conveyor belts having overlay elements which are mounted to the elongated rods using clips as described in the prior art have been found to be inadequate in many applications where the item to be conveyed adheres to the surface of the overlay element.

Moreover, with respect to hybrid conveyor belts where the overlay elements are slid on to the elongated rods and mounted at the ends, the present inventors have found that in certain applications, the mechanism that mounts the drive link to the end of the elongated rods pose sanitation issues. In particular, the securing mechanism such as the locking tab disclosed in Draebel et al. provide crevices and interfacing joints which are very difficult to clean. Thus, these crevices and joints provide an environment in which bacteria, mold, and fungus can readily grow and viruses can be conveyed and transferred, thus resulting in unsanitary conditions for food processing applications.

Moreover, in the prior art conveyor belts such as that disclosed in Draebel et al., the drive links cannot be readily mounted to the ends of the elongated rods without such locking tabs or similar locking mechanisms. As previously described, the drive links cannot be mounted to the end of the elongated rods using the conventional methods such as welding or other high temperature processes since the overlay element which is slidably received on to the elongated rod is typically made of a non-metallic material such as plastic, nylon, or other composite materials which will melt or otherwise be damaged by application of such high temperatures. Correspondingly, this also requires the use of non-metallic drive links with locking mechanisms with the associated disadvantages noted above since the integral locking mechanisms cannot be economically incorporated into such metal drive links.

Therefore, there exists an unfulfilled need for a conveyor belt with overlay elements in which the overlay elements are not easily removed from the conveyor belt. There also exists an unfulfilled need for such a conveyor belt with mechanisms for resisting removal of the overlay elements. In addition, there also exists an unfulfilled need for such a conveyor belt which will allow high temperature processing at the ends of the elongated rods, even when the overlay elements are made of a non-metallic material. Lastly, there also exists an unfulfilled need for such a conveyor belt in which facilitates cleaning so as to facilitate maintenance of sanitary conditions.

In view of the foregoing, one advantage of the present invention is in providing a conveyor belt with overlay elements in which overlay elements are not easily removed from the conveyor belt unintentionally.

Another advantage of the present invention is in providing such a conveyor belt which will allow high temperature processing in its manufacture, even when the overlay elements are made from a non-metallic material.

Still another advantage of the present invention is in providing such a conveyor belt which will minimize crevices to facilitate maintenance of sanitary conditions on the conveyor belt.

Yet another advantage of the present invention is in providing such a conveyor belt with a retainer to resist removal of the overlay elements.

Furthermore, still another advantage of the present invention is in providing such a conveyor belt with a locking mechanism to resist removal of the overlay elements.

Yet another advantage of the present invention is in providing a method of assembling a conveyor belt that will resist removal of the overlay elements.

In accordance with one embodiment of the present invention, conveyor belt is provided including a plurality of elongated rods interconnected with each other, a plurality of slide-in overlay elements, each having an upper surface and a transverse opening sized to slidably receive one of the elongated rods, and a plurality of retaining overlay elements, each having a transverse opening sized to receive one of the elongated rods and a vertical opening to allow vertical insertion of each retaining overlay element on to an elongated rod in a manner that each retaining element is adjacent to a slide-in overlay element.

In accordance with one preferred embodiment of the present invention, the vertical opening of each retaining overlay element includes a retainer that resists removal of the retaining overlay element from the elongated rod. In this regard, the retainer includes a clip portion that sizes the vertical opening smaller than a thickness dimension of the elongated rod in one embodiment. In addition, the combined transverse length of the slide-in overlay elements is longer than the combined transverse length of the retaining overlay elements in another embodiment.

In accordance with another preferred embodiment of the present invention, the slide-in overlay element includes a lock mechanism which locks an end of the retaining overlay element with an end of the slide-in overlay element to resist removal of the retaining overlay element. In this regard, in one embodiment, the lock mechanism includes a lock protrusion provided on an end of the slide-in overlay element that abuts the retaining overlay element, the lock protrusion being positioned proximate to the upper surface of the slide-in overlay element. The lock mechanism further includes an interlock protrusion provided on an end of the retaining overlay element that abuts the slide-in overlay element, the interlock protrusion being offset relative to the lock protrusion of the slide-in overlay element, thereby allowing interlocking of the lock protrusion with the interlock protrusion. In one such embodiment, the lock protrusion is positioned flush with the upper surface of the slide-in overlay element.

In accordance with still another embodiment of the present invention, each of the plurality of slide-in overlay elements and the plurality of retaining overlay elements include a plurality of spaced intermeshing extensions that form receiving compartments adapted receive intermeshing extensions of an adjacent overlay element thereby interlinking adjacent overlay elements together. In this regard, the transverse opening of each of the plurality of slide-in overlay elements and the plurality of retaining overlay elements are slots to allow the interlinked overlay elements to be nested together and extended away from one another. Furthermore, in one embodiment, each of the intermeshing extensions include a bulbous tip that are dimensioned so that vertical edge surfaces of the bulbous tip contacts vertical edge surfaces of bulbous tips of adjacent intermeshing extensions when the overlay elements are extended away from one another.

In accordance with yet another embodiment of the present invention, the retaining overlay element are preferably formed from a non-metallic material and the conveyor belt includes at least one link mounted to an end of the elongated rod using a high temperature process such as by welding and/or button head forming. The link preferably includes a transverse opening sized to receive an elongated rod therein and is formed from a non-metallic material. In one embodiment, the link is preferably a drive link adapted to facilitate driving of the conveyor belt. In another embodiment, the link includes an extension portion extending beyond the end of the elongated rod. In this regard, the extension portion is adapted to guide conveyance path of the conveyor belt in one embodiment while in another embodiment, the extension portion includes a drive surface adapted frictionally contact a drive mechanism to thereby drive the conveyor belt.

In accordance with another aspect of the present invention, a method of assembling a conveyor belt is provided including the steps of providing an elongated rod, providing a slide-in overlay element with a transverse opening sized to receive the elongated rod, sliding the slide-in overlay element on to the elongated rod, the transverse opening of the slide-in overlay element receiving the elongated rod, providing a retaining overlay element with a vertical opening and a transverse opening sized to receive the elongated rod, and vertically inserting the retaining overlay element on to the elongated rod via the vertical opening.

In accordance with one embodiment, the present method further includes the step of securing the retaining overlay element by clipping the retaining overlay element on to the elongated rod. In another embodiment, the present method includes the step of interlocking abutting ends of the retaining overlay element and the slide-in overlay element to resist removal of the retaining overlay element. Preferably, at least one of the slide-in overlay element and the retaining overlay element is formed from a non-metallic material and further includes the step of moving the slide-in overlay element away from an end of the elongated rod and subjecting the end of the elongated rod to a high temperature process before inserting the retaining overlay element on to the elongated rod. The high temperature process may include at least one of welding and button head forming.

In accordance with yet another embodiment, the present invention further includes the step of sliding a link with a transverse opening on to an end of the elongated rod, and sliding the link away from the end of the elongated rod before subjecting the end of the elongated rod to the high temperature process. The link mounted to the end of the elongated rod may be a drive link and/or include an extension portion extending beyond the end of the elongated rod.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 1 is a topographical view of a segment of a conveyor belt in accordance with one embodiment of the present invention.

FIG. 5 is a topographical view of a segment of conveyor belt in accordance with another embodiment of the present invention in a turn.

FIG. 6 is a front view of the retaining overlay element interlocked with the first and second slide-in overlay elements in accordance with one embodiment of the present invention.

FIG. 7 is a topographical view of a slide-in overlay element in accordance with another embodiment of the present invention.

FIG. 8 is a topographical view of a segment of conveyor belt in accordance with one embodiment of the present method where the second slide-in overlay elements are moved away from an end of the elongated rods.

FIG. 9 is a topographical view of the segment of conveyor belt shown in FIG. 8 where the second slide-in overlay elements are moved toward the end of the elongated rods.

FIG. 10A is a topographical view of a drive link in accordance one embodiment of the present invention.

FIG. 10B is a side view of the drive link of FIG. 10A.

DETAILED DESCRIPTION OF THE PREFERRED EMBODIMENT

Figure 2A:
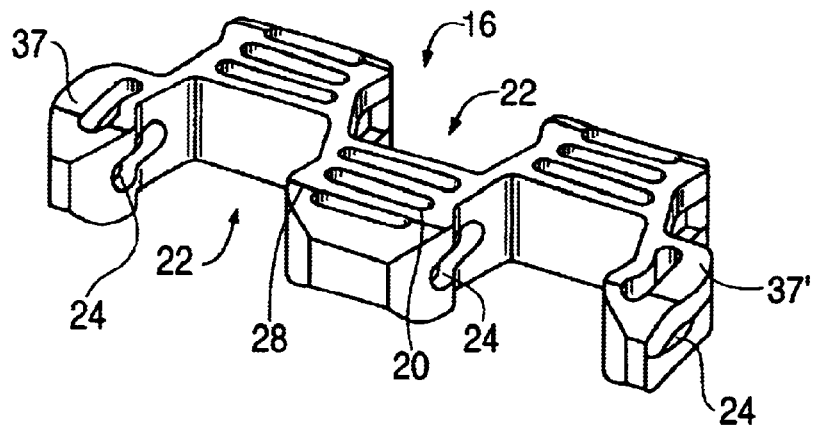
FIG. 2A is a perspective view of a first slide-in overlay element in accordance with one embodiment of the present invention.

FIG. 1 is a topographical view of a segment of a conveyor belt 10 in accordance with one embodiment of the present invention which will avoid the various disadvantages of the prior art conveyor belts described previously. It will be evident from the discussions below that the present invention provides a conveyor belt in which overlay elements are not easily removed from the conveyor belt and which will allow the elongated rods of the conveyor belt to be subjected to high temperature processes, even when the overlay elements are made from a non-metallic material. It will also be evident that the present invention provides such a conveyor belt which will minimize crevices and joint interfaces to facilitate maintenance of sanitary conditions. It will also be evident that the present invention also provides a method of assembling a conveyor belt that will resist removal of the overlay elements.

As can be seen in FIG. 1, the conveyor belt is a hybrid type having plurality of elongated rods 12 that are interconnected with each other by a plurality of links 14 which are mounted to the ends of the elongated rods 12. The links 14 in the illustrated embodiment are drive links known in the art used to allow driving of the conveyor belt 10 by a drive mechanism (not shown) such as a drive gear or sprocket that engages the elongated rods 12 through the links 14. It should also be noted that links 14 include transverse openings (not shown) that are adapted to receive the elongated rods 12. In this regard, one or more of the transverse openings may be slotted to allow collapse of the conveyor belt in the manner discussed hereinbelow.

The conveyor belt 10 also includes a plurality of slide-in overlay elements 16 and 17, the difference between the slide-in overlay elements 16 and 17 primarily being the number of intermeshing extensions described in further detail below. The conveyor belt 10 also includes a plurality of retaining overlay elements 18 that are adapted to be vertically inserted on to the elongated rods 12. The retaining overlay elements 18 are also adapted to engage the elongated rods 12 and the ends of the slide-in overlay elements 16 and 17 in the manner also described in further detail hereinbelow. It should be noted that in the illustrated embodiment of the present invention, the conveyor belt 10 is a hybrid conveyor belt in which the elongated rods 12 and links 14 are preferably made of metal such as stainless steel while the various overlay elements are made of a nonmetallic material such as plastic, nylon, or other composite materials. Of course, the teachings of the present invention may also be applied to conveyor belts which are not hybrid conveyor belts as well in other embodiments.

FIGS. 2A to 2D each show various views of a first slide-in overlay element 16 in accordance with one embodiment of the present invention. As can be seen in these figures, the first slide-in overlay element 16 includes a plurality of spaced intermeshing extensions 20 that form receiving compartments 22. It should be noted that only one of the plurality of spaced intermeshing extensions 20 have been labeled using numerals to maintain clarity in the figures. However, it should be recognized that the other intermeshing extensions in accordance with the present embodiment are provided with the same features as well.

Figure 2B:
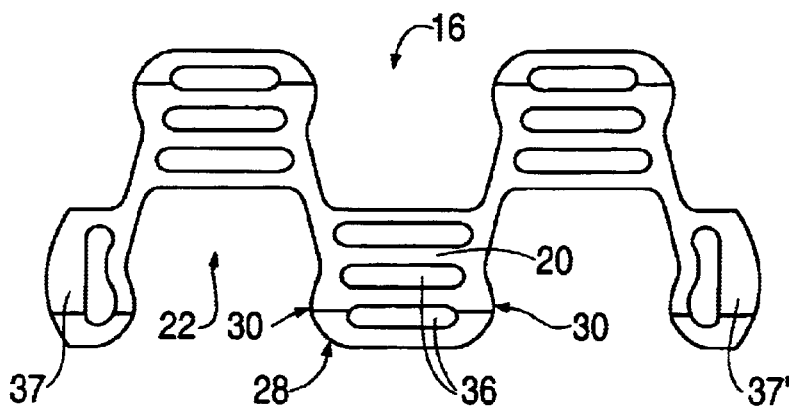
FIG. 2B is a topographical view of the first slide-in overlay element of FIG. 2A.

The receiving compartments 22 are adapted to receive intermeshing extensions of an adjacent overlay element thereby interlinking adjacent overlay elements together in the manner shown in FIG. 1. In addition, the first slide-in overlay element 16 also includes transverse openings 24 that are sized to slidably receive an elongated rod 12 therein, the transverse openings extending across the first slide-in overlay element 16 in a transverse direction of the conveyor belt 10. As can be appreciated by one of ordinary skill in the art upon reviewing FIGS. 1 to 2D, the transverse openings 24 of adjacent first slide-in overlay elements 16 align with one another upon the interlinking of adjacent overlay elements in the manner shown in FIG. 1 so that the elongated rod 12 can be slid therethrough. In this regard, the transverse opening 24 of the first slide-in overlay element 16 are slots as shown in FIG. 2D to allow interlinked first slide-in overlay elements 16 to be nested together and extended away from one another. This allows the conveyor belt 10 to be used as a turn conveyor where one side of the conveyor belt 10 is nested while the opposite side of the conveyor belt 10 is extended as shown in FIG. 5.

Figure 2C:
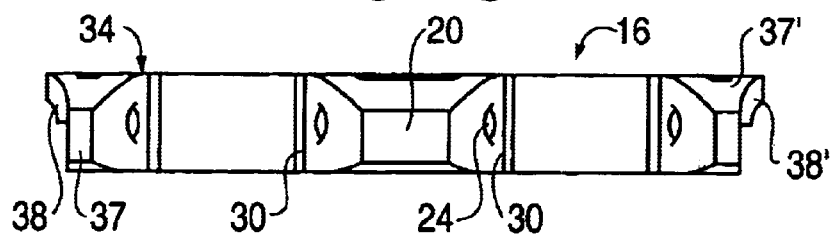
FIG. 2C is a front view of the first slide-in overlay element of FIG. 2A.
Figure 2D:
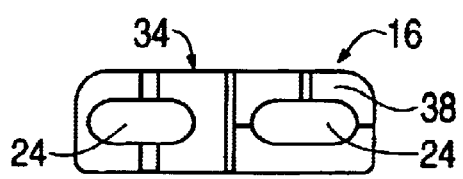
FIG. 2D is a left side view of the first slide-in overlay element of FIG. 2A.

Furthermore, in accordance with the illustrated embodiment of the present invention, the first slide-in overlay element 16 also includes a bulbous tip 28 that is dimensioned so that the vertical edge surfaces 30 most clearly shown in FIG. 2C contact corresponding vertical edge surfaces of bulbous tips of an adjacent intermeshing extension when the overlay elements are extended away from one another in the manner shown in FIG. 1. In the illustrated embodiment, the upper surface 34 of the first slide-in overlay element 16 includes a plurality of openings 36 most clearly shown in FIG. 2B which allow processing of the item being conveyed on the upper surface 34. For instance, if the conveyor belt 10 is used to convey and process food items, the plurality of openings 36 on the first slide-in overlay element 16 allows cold air to be circulated around the food item conveyed thereon if the food item is to be frozen, or allows water to be effectively drained if the food item is to be washed. Of course, these are merely examples of features of the illustrated embodiment of the first slide-in overlay element 16 and how the conveyor belt 10 in accordance with the present invention may be used and the present invention should not be limited thereto.

The illustrated embodiment of the first slide-in overlay element 16 also includes a lock mechanism which locks an end of the retaining overlay element 18 with an end of the first slide-in overlay element 16 to thereby resist the removal of the retaining overlay element 18. In this regard, in the illustrated embodiment, the lock mechanism includes a lock protrusion 38 most clearly seen in FIG. 2C provided on the end 37 of the first slide-in overlay element 16. As can be seen in FIG. 2B, the end 37 of the first slide-in overlay element 16 in the illustrated embodiment is essentially a portion of an intermeshing extension. Moreover, as can be further appreciated in FIGS. 2B and 2C, the illustrated example of the first slide-in overlay element 16 includes another end 37' having a lock protrusion 38' formed thereon. As can be seen in FIG. 2C, the lock protrusions 38 and 38' are positioned proximate to the upper surface 34 of the first slide-in overlay element 16. As will be discussed in further detail hereinbelow, the lock protrusion 38 provided on end 37 of the first slide-in overlay element 16 abuts the retaining overlay element 18 and interacts with a provision provided on the retaining overlay element 18 to thereby mount the retaining overlay element 18 in proper position.

Similar features are also provided in the embodiment of the second slide-in overlay element 17 shown in FIGS. 3A–3D. In this regard, the common features have been enumerated using similar numerals as those used for the first slide-in overlay element 16 except in the one hundreds. As can be seen, the second slide-in overlay element 17 includes a plurality of spaced intermeshing extensions 120 that form receiving compartments 122 adapted to receive intermeshing extensions of an adjacent overlay element and interlink adjacent overlay elements together in the manner shown in FIG. 1. The second slide-in overlay element 17 in the illustrated embodiment differs from the first slide-in overlay element 16 discussed above in that a different number of intermeshing extensions 120 are provided. Again, only one of the plurality of spaced intermeshing extensions 120 have been labeled using numerals to maintain clarity in the figures but the other intermeshing extensions are provided with the same features as well.

The second slide-in overlay element 17 includes transverse openings 124 that are sized to slidably receive an elongated rod 12 therein, the transverse openings 124 of adjacent second slide-in overlay elements 17 aligning with one another upon the interlinking of adjacent overlay elements in the manner shown in FIG. 1 so that the elongated rod 12 can be slid therethrough. In this regard, the transverse openings 124 of the second slide-in overlay element 17 are slots as shown in FIG. 3D to allow interlinked second slide-in overlay elements 17 to be nested together and extended away from one another as shown in FIG. 5.

Figure 3A:
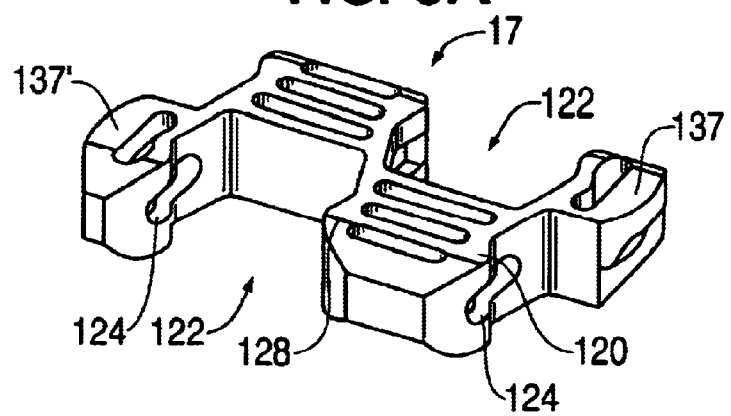
FIG. 3A is a perspective view of a second slide-in overlay element in accordance with one embodiment of the present invention.
Figure 3B:
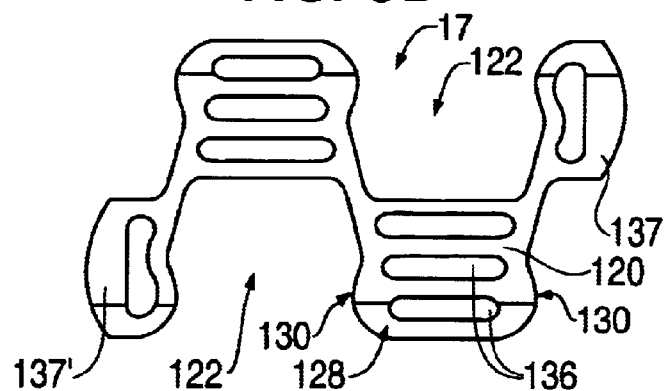
FIG. 3B is a topographical view of the second slide-in overlay element of FIG. 3A.
Figure 3C:
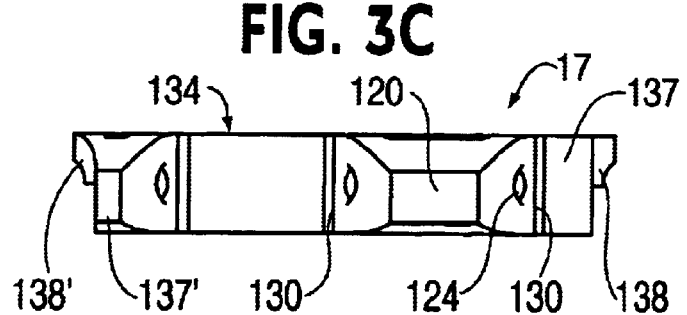
FIG. 3C is a front view of the second slide-in overlay element of FIG. 3A.
Figure 3D:
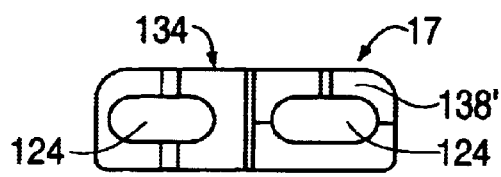
FIG. 3D is a left side view of the second slide-in overlay element of FIG. 3A.

Like the first slide-in overlay element 16, the intermeshing extensions 120 of the second slide-in overlay element 17 also includes a bulbous tip 128 dimensioned so that the vertical edge surfaces 130 shown in FIG. 3C contact corresponding vertical edge surfaces of bulbous tips of an adjacent intermeshing extension when the overlay elements are extended away from one another as shown in FIG. 1. The upper surface 134 of the second slide-in overlay element 17 includes a plurality of openings 136 which allow processing of the item being conveyed on the upper surface 134 in the manner previously described. The second slide-in overlay element 17 also includes lock protrusions 138 and 138' most clearly seen in FIG. 3C provided on the ends 137 and 137' respectively, the lock protrusions 138 and 138' being positioned proximate to the upper surface 134. As will be discussed in further detail hereinbelow, the lock protrusion 138 provided on end 137 of the second slide-in overlay element 17 abuts the retaining overlay element 18 and secures the retaining overlay element 18 in proper position.

FIGS. 4A–4D show various views of a retaining overlay element 18 in accordance with one embodiment of the present invention. In this regard, similar features are also provided on the retaining overlay element 18 of the illustrated embodiment as the first and second slide-in overlay elements 16 and 17 described above and thus, the common features have been enumerated using similar numerals except in the two hundreds. As can be seen, the retaining overlay element 18 also includes a plurality of spaced intermeshing extensions 220 that form receiving compartments 222 adapted to receive intermeshing extensions of an adjacent retaining overlay element thereby interlinking adjacent overlay elements together in the manner shown in FIG. 1. Like the above discussions, only one of the plurality of spaced intermeshing extensions 220 have been labeled using numerals to maintain clarity in the figures but the other intermeshing extensions are provided with the same features as well in the illustrated embodiment of the conveyor belt 10.

Figure 4A:
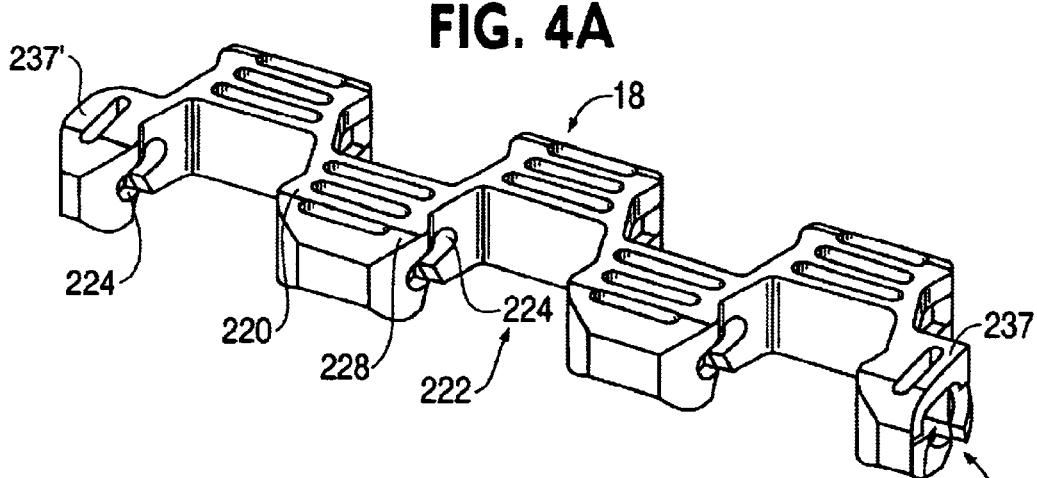
FIG. 4A is a perspective view of a retaining overlay element in accordance with one embodiment of the present invention.
Figure 4B:
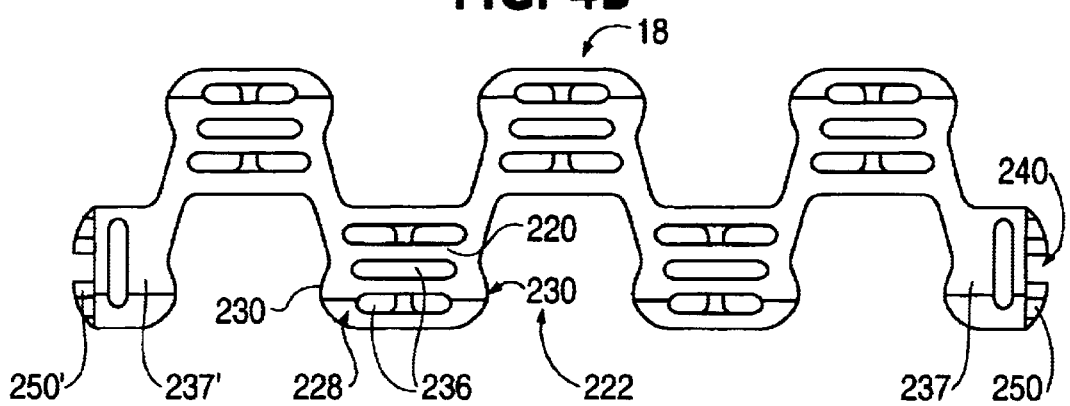
FIG. 4B is a topographical view of the retaining overlay element of FIG. 4A.
Figure 4C:
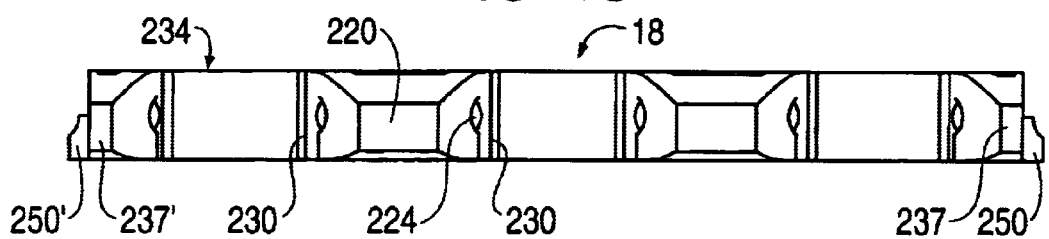
FIG. 4C is a front view of the retaining overlay element of FIG. 4A.
Figure 4D:
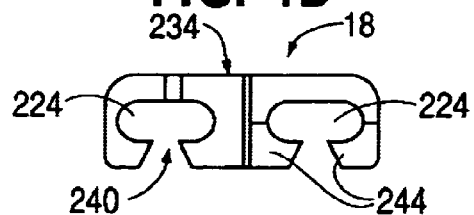
FIG. 4D is a left side view of the retaining overlay element of FIG. 4A.

The retaining overlay element 18 also includes transverse openings 224 that are sized to slidably receive an elongated rod 12 therein, the transverse openings 224 being slot shaped as shown in FIG. 4D to allow interlinked retaining overlay element 18 to be nested together and extended away from one another as shown in FIG. 5. The intermeshing extensions 220 of the retaining overlay element 18 also includes a bulbous tip 228 dimensioned so that the vertical edge surfaces 230 shown in FIG. 4C contact corresponding vertical edge surfaces of bulbous tips of an adjacent intermeshing extension when the overlay elements are extended away from one another as shown in FIG. 1. The upper surface 234 of the retaining overlay element 18 includes a plurality of openings 236 which allow processing of the item being conveyed as previously described.

As can be clearly seen in FIGS. 4A–4D, in addition to the transverse openings 224, the retaining overlay element 18 is provided with a vertical opening 240 to allow vertical insertion of the retaining overlay element 18 on to the elongated rod 12. As was clearly shown in FIG. 4D, the vertical opening 240 of the retaining overlay element 18 includes a retainer that resists the removal of the retaining overlay element 18 from the elongated rod 12. In the illustrated embodiment, the retainer is formed by clip portions 244 which size the vertical opening 240 smaller than the thickness dimension of the elongated rod 12 (i.e. diameter in this case) so that the retaining overlay element 18 is readily inserted on to the elongated rod 12 via the vertical opening 240 but the removal of the retaining overlay element 18 is resisted by the clip portions 244. In this manner, the illustrated embodiment of the present invention resists the unintentional removal of the retaining overlay element 18 once it is inserted on to the elongated rod 12.

Moreover, as can be clearly seen in FIG. 4C, the conveyor belt 10 in accordance with the illustrated embodiment is also provided with a lock mechanism which in the present embodiment, includes providing the retaining overlay element 18 with interlock protrusions 250 and 250' on the respective ends 237 and 237' of the retaining overlay element 18. These interlock protrusions 250 and 250' abut the first and second slide-in overlay elements 16 and 17 respectively. In this regard, FIG. 6 shows a front view of the retaining overlay element 18 interlocked with the first and second slide-in overlay elements 16 and 17 in accordance with one embodiment of the present invention as shown in FIG. 1, but with the elongated rods and the links 14 not being illustrated. As can be seen, the interlock protrusion 250 is offset relative to the lock protrusion 38 of the first slide-in overlay element 16 while the interlock protrusion 250' is offset relative to the lock protrusion 138 of the second slide-in overlay element 17. Thus, the first and second slide-in overlay elements 16 and 17 are positioned on the elongated rod 14 to abut the links 14 in the manner shown in FIG. 1, and then, the retaining overlay element 18 are inserted on to the elongated rod between the first and second slide-in overlay elements 16 and 17. Because the interlock protrusions 250 and 250' extend outwardly from the ends of the retaining overlay element 18, these interlock protrusions 250 and 250' interlock with the lock protrusions 38 and 138 of the first and second slide-in overlay elements 16 and 17 respectively in the manner shown in FIG. 6 when the retaining overlay element 18 is vertically inserted on to the elongated rod 14 of FIG. 1. In this manner, the illustrated embodiment of the present invention further resists the unintentional removal of the retaining overlay element 18 once it is installed on the elongated rod 14 by the interlocking of the lock protrusions 38 and 138 with the interlock protrusions 250 and 250' respectively.

It should be apparent to one of ordinary skill in the art that the various overlay elements described above are examples of the present invention only and the present invention is not limited thereto. Thus, the lock mechanism described above is merely one embodiment of the present invention and other lock mechanisms can also be used. For instance, a clip and/or receiver may be integrally formed at the ends of the overlay elements so that the ends of the overlay elements can be clipped together when the retaining overlay element is vertically installed on to the elongated rod. However, the above described embodiment has been found to be especially advantageous since it is simple to manufacture and minimizes crevices which can cause unsanitary conditions on the conveyor belt.

Moreover, the overlay elements in accordance with the present invention may also be used to provide conveyor belts having different widths needed for particular applications in other embodiments. This may be attained by using more slide-in overlay elements and/or more retaining overlay elements. For instance, whereas in the illustrated embodiment, three overlay elements (slide-in overlay elements 16 and 17, and retaining overlay elements 18) have been used to form the conveyor belt 10, fewer or more overlay elements may be used in other embodiments. Thus, a conveyor belt in accordance with the present invention may be formed using only one slide-in overlay element and the retaining overlay element 18 or greater number of slide-in overlay elements and retaining overlay elements. In such embodiments, the lock protrusions 37' and 137' of the first and second slide-in overlay elements 16 and 17 respectively can interlock with abutting retaining overlay element in the manner described above thereby securing the retaining overlay elements to resist unintentional removal thereof.

Alternatively or in addition, larger or smaller slide-in and/or retaining overlay elements may be used. For instance, FIG. 7 illustrates a slide-in overlay element 300 in accordance with another embodiment which may be used instead of, or in addition to, the first and/or second slide-in overlay elements shown in FIG. 1 to provide a conveyor belt having a different width dimension. As can be seen, the slide-in overlay element 300 includes additional intermeshing extensions that increase the transverse length of the slide-in overlay element 300 as compared to the first slide-in overlay element 16. Of course, in the above described embodiments, the elongated rods must also be correspondingly dimensioned to accommodate the various combinations of overlay elements used.

Preferably, the combined transverse length of the slide-in overlay elements would be longer than the combined transverse length of the retaining overlay elements. In other words, a greater portion of the transverse width of the conveyor belt is preferably provided by the slide-in overlay elements than by the retaining overlay elements. This is particularly advantageous in that the slide-in overlay elements cannot be removed vertically. Consequently, although items being conveyed may adhere to the surface of the slide-in overlay elements, such overlay elements would not be removed with the item being conveyed. By providing slide-in overlay elements with combined transverse length which are longer than the combined transverse length of the retaining overlay elements, a large portion of the surface area of the conveyor belt is not readily removed with the item being conveyed. In addition, by providing both the retainer such as the clip portions 244 that engages the elongated rods, as well as the interlock protrusions 250 and 250' which interlock with the lock protrusions 38 and 138 of the first and second slide-in overlay elements 16 and 17 respectively, the likelihood of unintentional removal of the retaining overlay element 18 is substantially reduced.

Moreover, the above described flexibility in using the overlay elements in accordance with the present invention allows the manufacturer of the conveyor belts to provide conveyor belts of various widths using a combination of various slide-in and retaining overlay elements instead of having to custom manufacture overlay elements of a particular specified transverse length for each application where the transverse width of the conveyor belt is different. As can be appreciated, this greatly reduces the manufacturing and product costs associated with the conveyor belt.

FIGS. 8 and 9 show a topographical view of the segment of conveyor belt 10 shown in FIG. 1 which is only partially assembled to describe hereinbelow, a method of assembling a conveyor belt in accordance with the present invention. In accordance with one embodiment of the present method, the first slide-in overlay elements 16 and the second slide-in overlay elements 17 are slid on to the elongated rods 12 so that the elongated rods 12 are received in the transverse openings of the overlay elements. Preferably, the first and second slide-in overlay elements 16 and 17 are formed from a non-metallic material such as molded plastic, nylon or other composite materials. As can be seen in the illustration of FIG. 8, the first slide-in overlay elements 16 and the second slide-in overlay elements 17 are then moved toward the center of the elongated rods 12 away from the ends of the elongated rods 12.

In the illustrated embodiment of FIG. 8, the links 14 are then slid on to the ends of the elongated rods 12, the links 14 being metallic such as stainless steel. The ends of the elongated rods 12 are then subjected to a high temperature process to form the button heads 15 thereon thereby mounting the links 14 to the ends of the elongated rods 12. This may be attained by passing current through the end of the elongated rods and compressing the ends to form the button heads 15. In alternative embodiments, the links 14 may be directly welded to the ends of the elongated rods 12 in lieu of, or in addition to, forming the button heads 15. As can be appreciated from FIG. 8, because the first slide-in overlay elements 16 and the second slide-in overlay elements 17 are moved toward the center of the elongated rods 12 away from the ends of the elongated rods 12 where the button heads 15 are formed, these overlay elements are not melted or otherwise damaged by the high temperature at the ends even though they are formed from a nonmetallic material. Of course, if the overlay elements are not moved away from the ends of the elongated rods 12 while the ends are subjected to the high temperature process, they will melt or otherwise be damaged by the high temperatures.

After the ends of the elongated rods 12 with the button heads 15 formed thereon cool sufficiently, the first slide-in overlay elements 16 and the second slide-in overlay elements 17 are moved toward the respective ends of the elongated rods 12 to the positions shown in FIG. 9. Then, the retaining overlay elements 18 with a vertical opening and a transverse opening as described previously above are vertically inserted on to the elongated rod between the first slide-in overlay elements 16 and the second slide-in overlay elements 17 in the manner shown in FIG. 1. As previously described, the retaining overlay elements 18 are secured to the elongated rods by the clip portions 244 as discussed relative to FIG. 4D. In addition, the ends of the retaining overlay elements 18 are interlocked to the abutting ends of the first and second slide-in overlay element 16 and 17 respectively to resist removal of the retaining overlay element 18. In the illustrated embodiment, this is attained by the interlocking of the interlocking protrusions 250 and 250' of the retaining overlay element 18 with the lock protrusions 38 and 138 of the first and second slide-in overlay elements 16 and 17 respectively in the manner previously described and shown in FIG. 6. In the above described manner, by allowing the slide-in overlay elements to be moved away from the end of the elongated rods, the links 14 may be mounted to the ends of the elongated rods 12 using a high temperature process including welding and/or button head forming.

As previously noted, the above described embodiment of the link 14 is formed of a metallic material such as stainless steel. However, in accordance with yet another embodiment, the link may also be made of a non-metallic material similar to that of the first and second slide-in overlay elements 16 and 17 such as plastic, nylon or other composite materials. In such an embodiment, the present method further includes the step of sliding the link with a transverse opening on to an end of the elongated rod, and sliding the link away from the end of the elongated rod before subjecting the end of the elongated rod to the high temperature process such as welding and/or button head forming so that the link is not damaged by the high temperatures. Then, in a similar manner to the above described overlay elements, the button head may be formed on the end of the elongated rods and the link moved back to the ends of the elongated rods once the ends have cooled.

FIGS. 10A and 10B show an example of such a link 400 that is made from a non-metallic material in accordance with one embodiment of the present invention which may be used instead of the links 14 as shown and discussed previously. The link 400 preferably includes transverse openings 402 and 404 that are sized to receive elongated rod 412 therein, only a portion of the elongated rod 412 being shown. In this regard, the transverse opening 404 is preferably a slot as clearly shown in FIG. 10B to allow the links to be nested together with adjacent links as previously described. The link 400 may be mounted to the end of the elongated rod 412 in the manner also described above where it is moved away from the end of the elongated rod 412, a button head 415 is formed thereon, and the link 400 is moved back with the overlay elements (not shown) to abut the button head 415 and allow installation of the retaining overlay element in the manner previously described. Because the link 400 is mounted and retained on the end of the elongated rod 412 by the button head 415 formed thereon, there is no need for special provisions on the link or a retaining clip of type used in the prior art to mount the link 400 in accordance with the illustrated embodiment. This minimizes joints or crevices thereby facilitating cleaning of the conveyor belt and reducing the likelihood of unsanitary conditions existing on the conveyor belt. Of course, it should now be evident that such mounting of the link 400 is made possible by the fact that the retaining overlay element is vertically insertable as previously described.

In the illustrated embodiment, the link 400 is preferably a drive link adapted to facilitate driving of the conveyor belt. Because the link 400 is made of a non-metallic material in the illustrated embodiment, it may be provided with special features that enhance the utility of the link 400. For instance, as can be seen most clearly in FIG. 10A, the link 400 in accordance with the illustrated embodiment includes an extension portion 406 that extends beyond the end of the elongated rod 412, and in particular, extends beyond the button head 415. This extension portion 406 can be used to provide a drive surface 408 which is adapted frictionally contact a drive mechanism (not shown) to thereby drive the conveyor belt. The drive mechanism may be a cylindrical drum used in the helical accumulator similar to that disclosed in U.S. Pat. No. 5,070,999 to Layne et al. or other mechanism for driving the conveyor belt. In other embodiments, the extension portion 406 can be used to guide the conveyance path of the conveyor belt. For instance, the extension portion 406 may be slotted into a guide groove (not shown) which extends beside the path of the conveyor, the extension portion 406 being received within the guide groove to thereby prevent upward buckling of the conveyor belt. In this regard, it should be noted that the extension portion 408 as shown in FIG. 10A is merely one example and the present invention is not limited thereto. The extension portion 408 may be shaped differently depending on the application. For example, the extension portion 408 may be also provided with additional flanges (not shown) that extend perpendicular to the plane of the conveyor belt in other embodiments.

In view of the above discussion, it should now be evident how the present invention provides a conveyor belt which will avoid the various disadvantages of the prior art conveyor belts described previously and will resist removal of the overlay elements. It should also be evident that the present invention also provides an effective method of assembling a conveyor belt that will resist removal of the overlay elements.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A conveyor belt comprising:
   a plurality of elongated rods interconnected with each other;
   a plurality of slide-in overlay elements, each having an upper surface adapted to support items to be conveyed, and a transverse opening sized to slidably receive one of the elongated rods; and
   a plurality of retaining overlay elements, each having an upper surface adapted to support items to be conveyed, a transverse opening sized to receive one of the elongated rods, and a vertical opening to allow vertical insertion of each retaining overlay element on to an elongated rod in a manner that each retaining element is adjacent to a slide-in overlay element;
   wherein said upper surface of each of the plurality of slide-in overlay elements are substantially coplanar to the upper surface of each of the plurality of retaining overlay elements; and
   wherein each of the plurality of slide-in overlay elements and the plurality of retaining overlay elements include a plurality of spaced intermeshing extensions that form receiving compartments adapted receive intermeshing extensions of an adjacent overlay element thereby interlinking adjacent overlay elements together, the vertical opening of each of the plurality of retaining overlay elements being positioned on an intermeshing extension.

2. The conveyor belt of claim 1, wherein the vertical opening of each retaining overlay element includes a retainer that resists removal of the retaining overlay element from the elongated rod.

3. The conveyor belt of claim 2, wherein the retainer includes a clip portion that sizes the vertical opening smaller than a thickness dimension of the elongated rod.

4. The conveyor belt of claim 1, wherein the transverse opening of each of the plurality of slide-in overlay elements and the plurality of retaining overlay elements are slots to allow the interlinked overlay elements to be nested together and extended away from one another.

5. The conveyor belt of claim 4, wherein each of the intermeshing extensions include a bulbous tip.

6. The conveyor belt of claim 1, wherein the slide-in overlay element and the retaining overlay element are formed from a non-metallic material.

7. The conveyor belt of claim 6, further including at least one link mounted to an end of the elongated rod.

8. The conveyor belt of claim 7, wherein the link is mounted to the end of the elongated rod using a high temperature process including at least one of welding and button head forming.

9. The conveyor belt of claim 7, wherein the link includes a transverse opening sized to receive an elongated rod therein.

10. The conveyor belt of claim 9, wherein the link is formed from a nonmetallic material.

11. The conveyor belt of claim 1, wherein combined transverse length of the plurality of slide-in overlay elements is longer than combined transverse length of the plurality of retaining overlay elements.

12. A conveyor belt comprising:
    a plurality of elongated rods interconnected with each other;
    a plurality of slide-in overlay elements, each having an upper surface, and a transverse opening sized to slidably receive one of the elongated rods; and
    a plurality of retaining overlay elements, each having a transverse opening sized to receive one of the elongated rods, and a vertical opening to allow vertical insertion of each retaining overlay element on to an elongated rod in a manner that each retaining element is adjacent to a slide-in overlay element;
    wherein the slide-in overlay element includes a lock mechanism which locks an end of the retaining overlay element with an end of the slide-in overlay element to resist removal of the retaining overlay element.

13. The conveyor belt of claim 12, wherein the lock mechanism includes a lock protrusion provided on an end of the slide-in overlay element that abuts the retaining overlay element, the lock protrusion being positioned proximate to the upper surface of the slide-in overlay element.

14. The conveyor belt of claim 12, wherein the lock mechanism further includes an interlock protrusion provided on an end of the retaining overlay element that abuts the slide-in overlay element, the interlock protrusion being offset relative to the lock protrusion of the slide-in overlay element, thereby allowing interlocking of the lock protrusion with the interlock protrusion.

15. The conveyor belt of claim 12, wherein the lock protrusion is positioned flush with the upper surface of the slide-in overlay element.

16. The conveyor belt of claim 12, wherein the vertical opening of each retaining overlay element includes a retainer that resists removal of the retaining overlay element from the elongated rod.

17. The conveyor belt of claim 16, wherein the retainer includes a clip portion that sizes the vertical opening smaller than a thickness dimension of the elongated rod.

18. A conveyor belt comprising:
    a plurality of elongated rods interconnected with each other;

a plurality of slide-in overlay elements, each having an upper surface, and a transverse opening sized to slidably receive one of the elongated rods; and a plurality of retaining overlay elements, each having a transverse opening sized to receive one of the elongated rods, and a vertical opening to allow vertical insertion of each retaining overlay element on to an elongated rod in a manner that each retaining element is adjacent to a slide-in overlay element;

wherein each of the plurality of slide-in overlay elements and the plurality of retaining overlay elements include a plurality of spaced intermeshing extensions that form receiving compartments adapted receive intermeshing extensions of an adjacent overlay element thereby interlinking adjacent overlay elements together;

wherein the transverse opening of each of the plurality of slide-in overlay elements and the plurality of retaining overlay elements are slots to allow the interlinked overlay elements to be nested together and extended away from one another;

wherein each of the intermeshing extensions include a bulbous tip;

wherein the bulbous tip of each of the intermeshing extensions are dimensioned so that vertical edge surfaces of the bulbous tip contacts vertical edge surfaces of bulbous tips of adjacent intermeshing extensions when the overlay elements are extended away from one another.

19. A conveyor belt comprising:

a plurality of elongated rods interconnected with each other;

a plurality of slide-in overlay elements, each having an upper surface, and a transverse opening sized to slidably receive one of the elongated rods; and a plurality of retaining overlay elements, each having a transverse opening sized to receive one of the elongated rods, and a vertical opening to allow vertical insertion of each retaining overlay element on to an elongated rod in a manner that each retaining element is adjacent to a slide-in overlay element;

wherein the slide-in overlay element and the retaining overlay element are formed from a non-metallic material;

further including at least one link mounted to an end of the elongated rod;

wherein the link includes a transverse opening sized to receive an elongated rod therein;

wherein the link is formed from a non-metallic material;

wherein the link is a drive link adapted to facilitate driving of the conveyor belt.

20. A conveyor belt comprising:

a plurality of elongated rods interconnected with each other;

a plurality of slide-in overlay elements, each having an upper surface, and a transverse opening sized to slidably receive one of the elongated rods; and a plurality of retaining overlay elements, each having a transverse opening sized to receive one of the elongated rods, and a vertical opening to allow vertical insertion of each retaining overlay element on to an elongated rod in a manner that each retaining element is adjacent to a slide-in overlay element;

wherein the slide-in overlay element and the retaining overlay element are formed from a non-metallic material;

further including at least one link mounted to an end of the elongated rod;

wherein the link includes a transverse opening sized to receive an elongated rod therein;

wherein the link is formed from a non-metallic material;

wherein the link includes an extension portion extending beyond the end of the elongated rod.

21. The conveyor belt of claim 20, wherein the extension portion is adapted to guide conveyance path of the conveyor belt.

22. The conveyor belt of claim 20, wherein the extension portion includes a drive surface adapted frictionally contact a drive mechanism to thereby drive the conveyor belt.

23. A method of assembling a conveyor belt comprising the steps of:

providing an elongated rod;

providing a slide-in overlay element with a transverse opening sized to receive the elongated rod;

sliding the slide-in overlay element on to the elongated rod, the transverse opening of the slide-in overlay element receiving the elongated rod;

providing a retaining overlay element with a vertical opening and a transverse opening sized to receive the elongated rod; and vertically inserting the retaining overlay element on to the elongated rod via the vertical opening.

24. The method of claim 23, further including the step of interlocking abutting ends of the retaining overlay element and the slide-in overlay element to resist removal of the retaining overlay element.

25. The method of claim 23, further including the step of securing the retaining overlay element by clipping the retaining overlay element on to the elongated rod.

26. The method of claim 23, wherein at least one of the slide-in overlay element and the retaining overlay element is formed from a non-metallic material.

27. The method of claim 26, further including the step of moving the slide-in overlay element away from an end of the elongated rod and subjecting the end of the elongated rod to a high temperature process before inserting the retaining overlay element on to the elongated rod.

28. The method of claim 27, wherein the high temperature process includes at least one of welding and button head forming.

29. The method of claim 27, further including the step of sliding a link with a transverse opening on to an end of the elongated rod.

30. The method of claim 29, further including the step of sliding the link away from the end of the elongated rod before subjecting the end of the elongated rod to the high temperature process.

31. The method of claim 30, wherein the link includes an extension portion extending beyond the end of the elongated rod.

32. The method of claim 30, wherein the link is a drive link mounted to the end of the elongated rod.

* * * * *